United States Patent
Xu et al.

(10) Patent No.: US 9,681,397 B2
(45) Date of Patent: Jun. 13, 2017

(54) FORMAT DEPENDENT POWER CONTROL FOR COORDINATED MULTIPOINT TRANSMISSION

(71) Applicant: QUALCOMM Incorporated, San Diego, CA (US)

(72) Inventors: Hao Xu, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 13/836,173

(22) Filed: Mar. 15, 2013

(65) Prior Publication Data

US 2013/0258884 A1 Oct. 3, 2013

Related U.S. Application Data

(60) Provisional application No. 61/616,370, filed on Mar. 27, 2012.

(51) Int. Cl.
*H04W 52/24* (2009.01)
*H04W 52/36* (2009.01)

(52) U.S. Cl.
CPC ......... *H04W 52/243* (2013.01); *H04W 52/36* (2013.01)

(58) Field of Classification Search
CPC . H04W 52/243; H04W 52/40; H04W 52/286; H04W 52/146; H04W 52/36
USPC .................................. 370/252, 329; 455/522
See application file for complete search history.

(56) References Cited

U.S. PATENT DOCUMENTS

| | | | |
|---|---|---|---|
| 5,940,743 A * | 8/1999 | Sunay et al. | 455/69 |
| 6,556,554 B1 * | 4/2003 | Yun et al. | 370/335 |
| 6,754,505 B1 * | 6/2004 | Baker et al. | 455/522 |
| 7,085,531 B2 | 8/2006 | Ozluturk | |

(Continued)

FOREIGN PATENT DOCUMENTS

| | | | |
|---|---|---|---|
| WO | 2008050998 A1 | 5/2008 | |
| WO | 2009072945 A1 | 6/2009 | |
| WO | 2009096830 A1 | 8/2009 | |

OTHER PUBLICATIONS

ETRI, "Discussion on further details of Scenario 4", 3GPP Draft; R1-111000 Comp Scenario 4, 3rd Generation Partnership Project (3GPP), Mobile Competence Centre ; 650, Route Des Lucioles ; F-06921 Sophia-Antipolis Cedex ; France, vol. RAN WG1, No. Taipei, Taiwan; Feb. 21, 2011, Feb. 15, 2011 (Feb. 15, 2011) , XP050490699.

(Continued)

*Primary Examiner* — Rasheed Gidado
(74) *Attorney, Agent, or Firm* — Arent Fox, LLP

(57) ABSTRACT

An apparatus determines a transmission power of a signal transmitted by a user equipment (UE) in a cell that is identified by a virtual cell identifier. The apparatus generates a power control command based on the determined signal power, and transmits the power control command to a plurality of UEs. Subsequent to transmission of the power control command, the apparatus receives a plurality of transmissions from the plurality of UEs. Some of the transmissions have different transmission powers. The different transmission powers of the signals transmitted by the UEs are due to the power control command and a predefined power offset associated with each respective UE.

66 Claims, 14 Drawing Sheets

(56) References Cited

U.S. PATENT DOCUMENTS

| | | | |
|---|---|---|---|
| 7,349,712 B2* | 3/2008 | Yoshimura | H04W 52/343 370/311 |
| 7,558,230 B2* | 7/2009 | Lee et al. | 370/318 |
| 7,561,894 B2* | 7/2009 | Nishio et al. | 455/522 |
| 8,005,499 B2* | 8/2011 | Wigard et al. | 455/522 |
| 8,385,969 B2* | 2/2013 | Zhang et al. | 455/522 |
| 8,666,441 B2* | 3/2014 | Chao et al. | 455/522 |
| 8,688,165 B2* | 4/2014 | Wallen et al. | 455/522 |
| 8,880,114 B2* | 11/2014 | Bergman et al. | 455/522 |
| 2002/0136193 A1* | 9/2002 | Chang | H04W 52/262 370/347 |
| 2002/0150058 A1* | 10/2002 | Kim | H04B 7/2656 370/280 |
| 2004/0203987 A1* | 10/2004 | Butala | H04W 52/367 455/522 |
| 2004/0242254 A1* | 12/2004 | Muraoka | H04B 7/0891 455/522 |
| 2008/0280638 A1* | 11/2008 | Malladi | H04W 52/08 455/522 |
| 2008/0316950 A1* | 12/2008 | Damnjanovic | 370/311 |
| 2009/0104879 A1* | 4/2009 | Moulsley | H04L 27/0008 455/68 |
| 2009/0197630 A1* | 8/2009 | Ahn | H04L 1/0029 455/522 |
| 2010/0062783 A1 | 3/2010 | Luo et al. | |
| 2010/0331035 A1* | 12/2010 | Bark et al. | 455/522 |
| 2011/0098054 A1 | 4/2011 | Gorokhov et al. | |
| 2011/0199945 A1* | 8/2011 | Chang et al. | 370/281 |
| 2011/0250918 A1* | 10/2011 | Jen | H04W 52/08 455/509 |
| 2011/0256901 A1 | 10/2011 | Guey | |
| 2011/0319121 A1* | 12/2011 | Jen | 455/522 |
| 2012/0208589 A1* | 8/2012 | Kiyoshima | H04W 52/242 455/522 |
| 2012/0282964 A1 | 11/2012 | Xiao et al. | |
| 2012/0329503 A1* | 12/2012 | Jongren et al. | 455/509 |
| 2013/0077569 A1* | 3/2013 | Nam et al. | 370/328 |
| 2013/0114569 A1* | 5/2013 | Anderson | H04W 52/06 370/335 |

OTHER PUBLICATIONS

International Search Report and Written Opinion—PCT/US2013/032856—ISA/EPO—Jun. 4, 2013.

* cited by examiner

FORMAT DEPENDENT POWER CONTROL FOR COORDINATED MULTIPOINT TRANSMISSION

CROSS-REFERENCE TO RELATED APPLICATION(S)

This application claims the benefit of U.S. Provisional Application Ser. No. 61/616,370, entitled "Format Dependent Power Control For Coordinated Multipoint Transmission" and filed on Mar. 27, 2012, which is expressly incorporated by reference herein in its entirety.

BACKGROUND

Field

The present disclosure relates generally to communication systems, and more particularly, to power control in a wireless communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, an apparatus, such as a base station, determines a transmission power of a signal transmitted by a user equipment (UE) in a cell. The apparatus generates a power control command based on the determined signal power, and transmits the power control command to a plurality of UEs. Subsequent to transmission of the power control command, the apparatus receives a plurality of transmissions from the plurality of UEs. Some of the transmissions have different transmission powers. The different transmission powers of the signals transmitted by the UEs are due to the power control command and a predefined power offset associated with each respective UE.

In another aspect, an apparatus, such as a UE, transmits a first signal in a cell. The apparatus receives a predefined power offset and a power control command. The apparatus transmits a second signal in the cell. The second signal is transmitted at a signal power that is determined based on the power control command and the predefined offset. The power control command may be based on a determined power signal that corresponds to the transmission power of the transmitted first signal. The signal power used to transmit the second signal may be determined by adjusting a power value in the power control command based on the predefined power offset.

DETAILED DESCRIPTION

Figure 1:
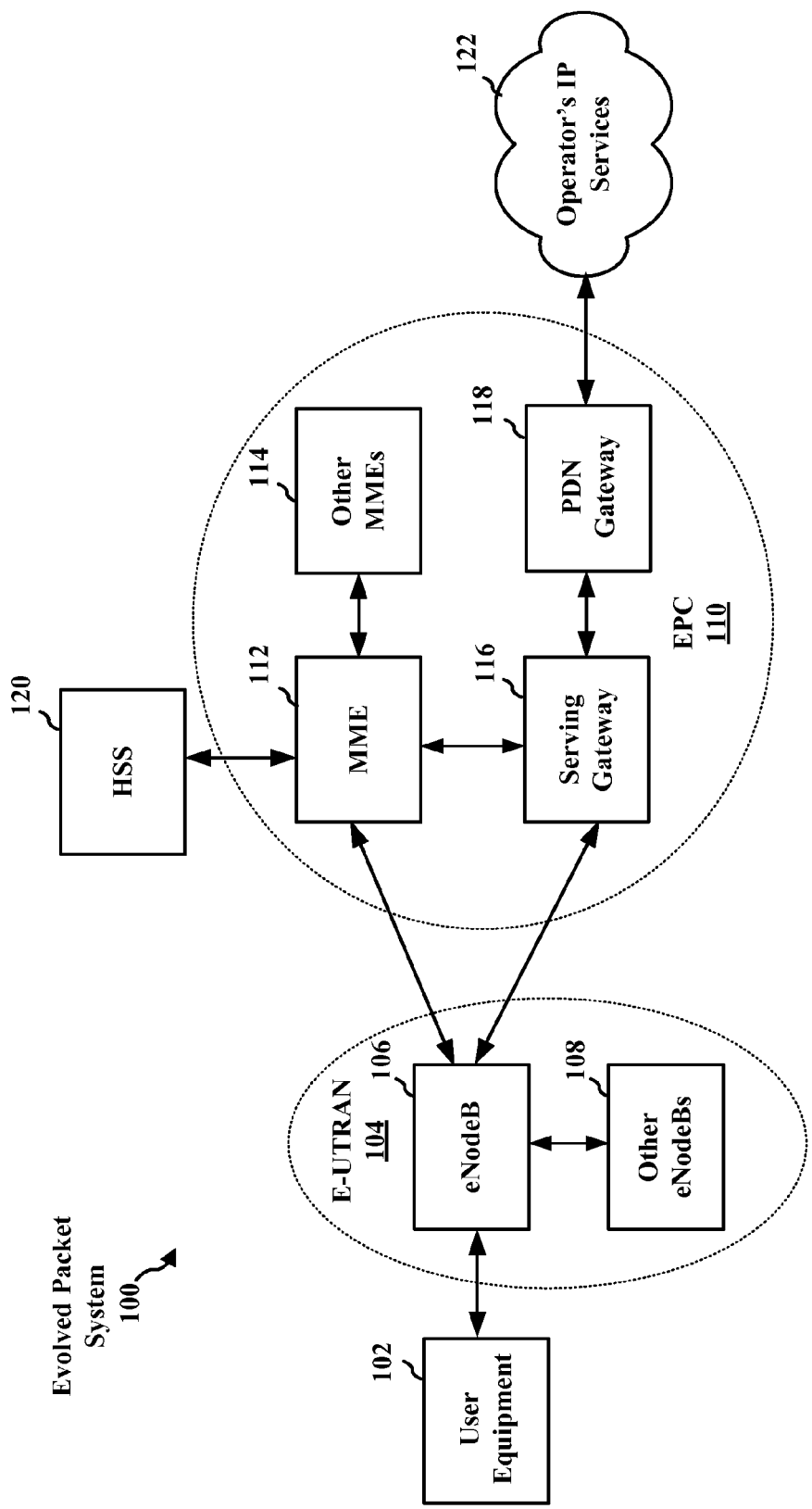
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UEs 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
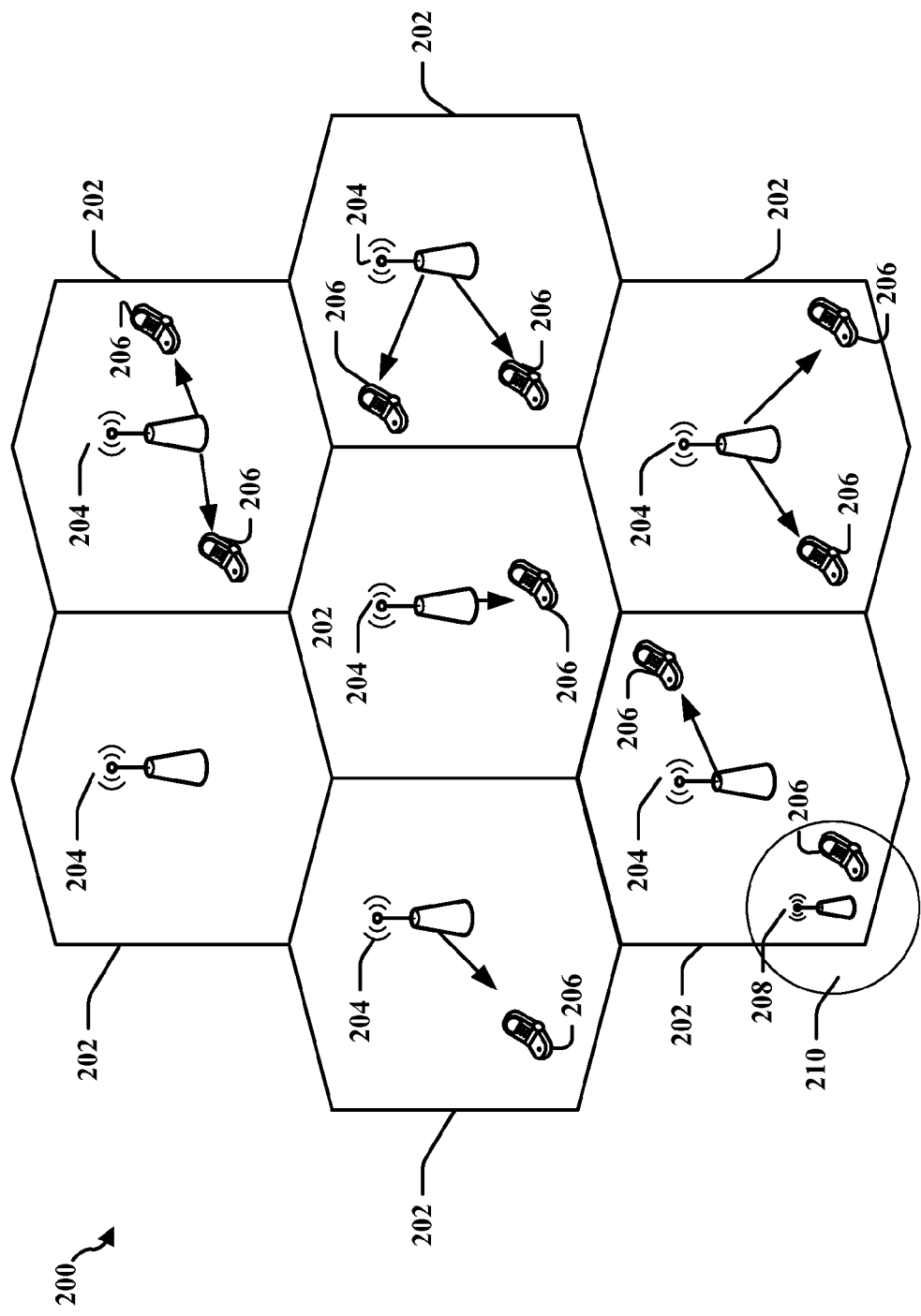
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
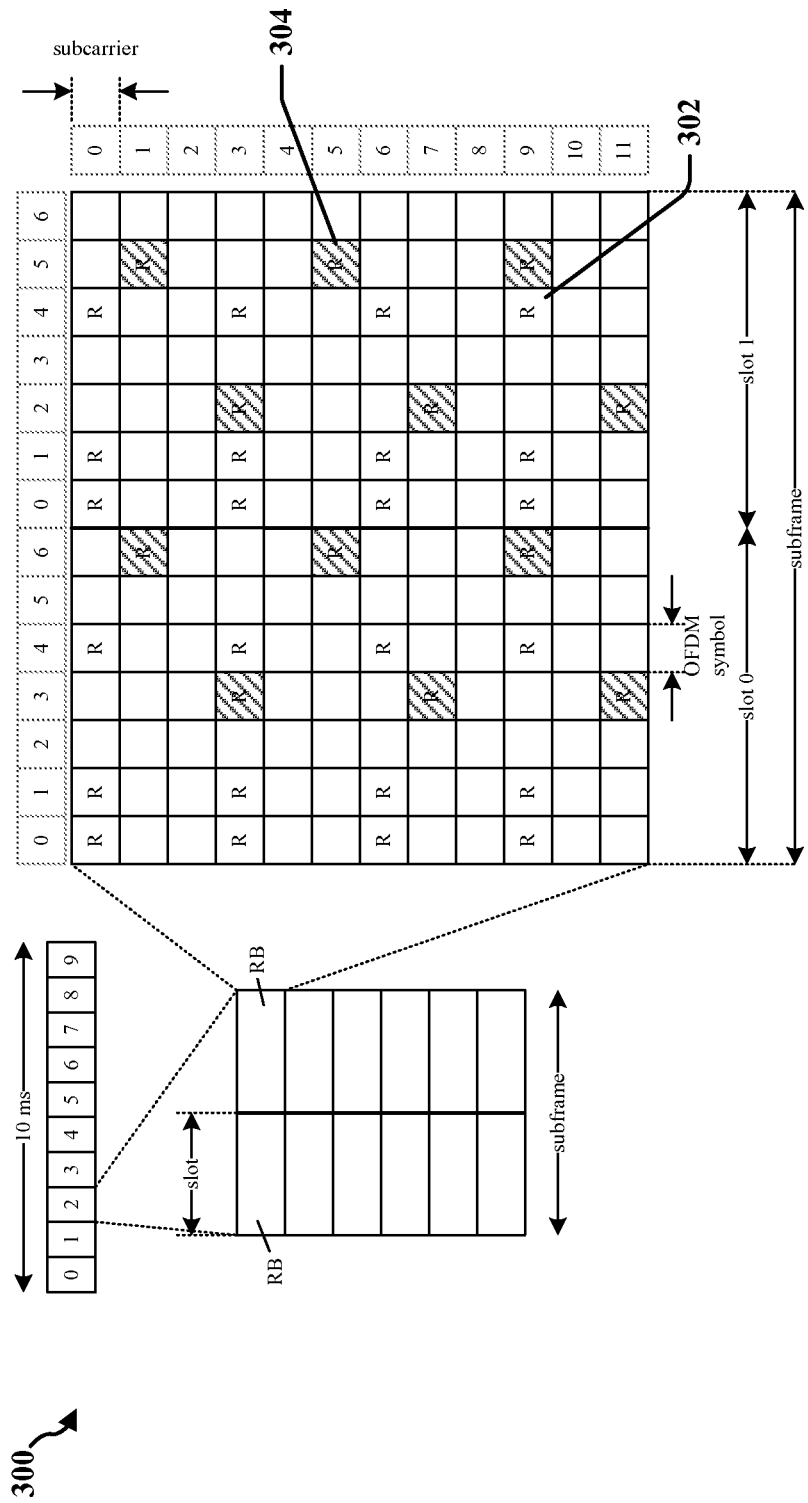
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
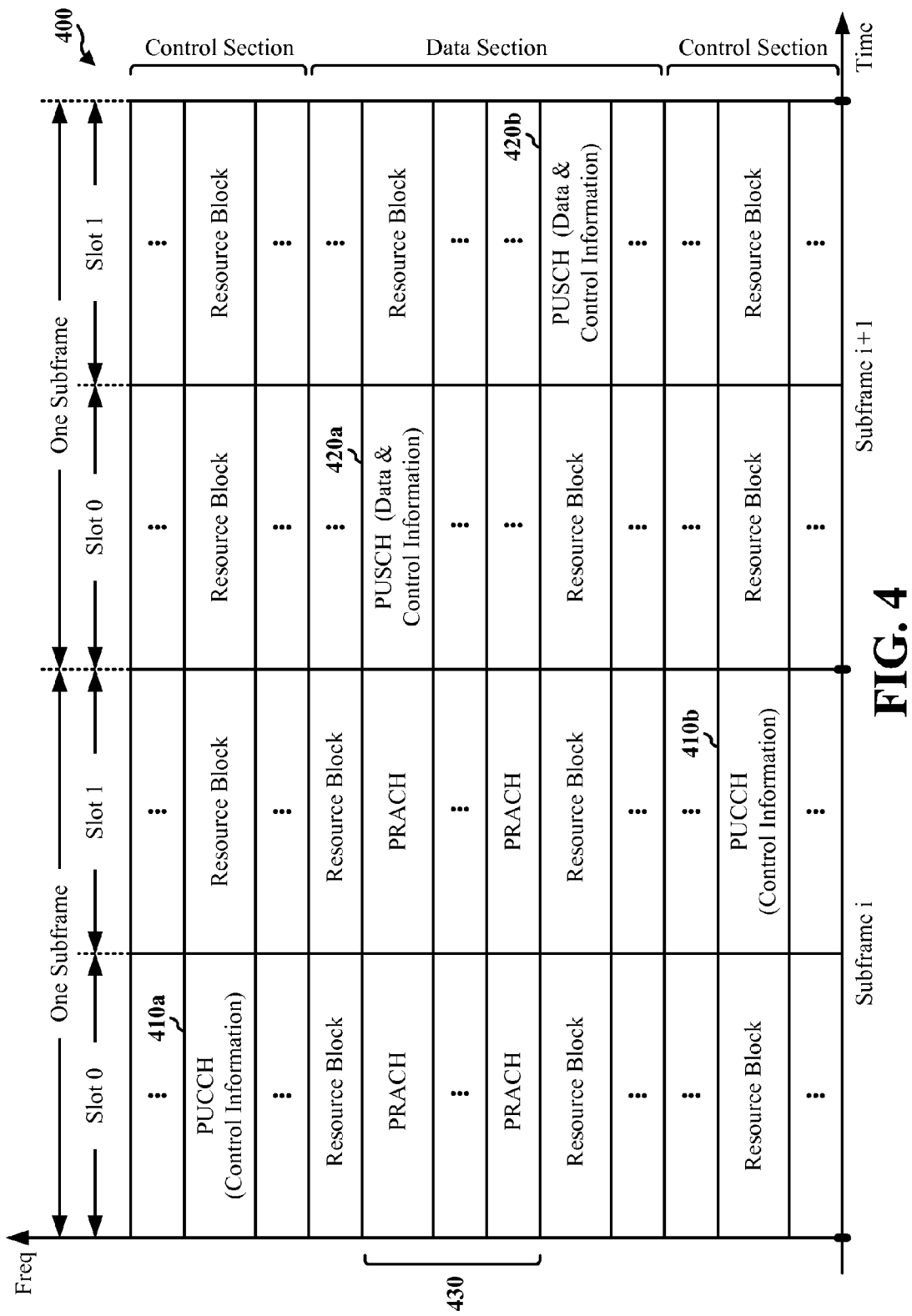
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of contiguous subframes and a UE can make only a single PRACH attempt per frame (10 ms).

Figure 5:
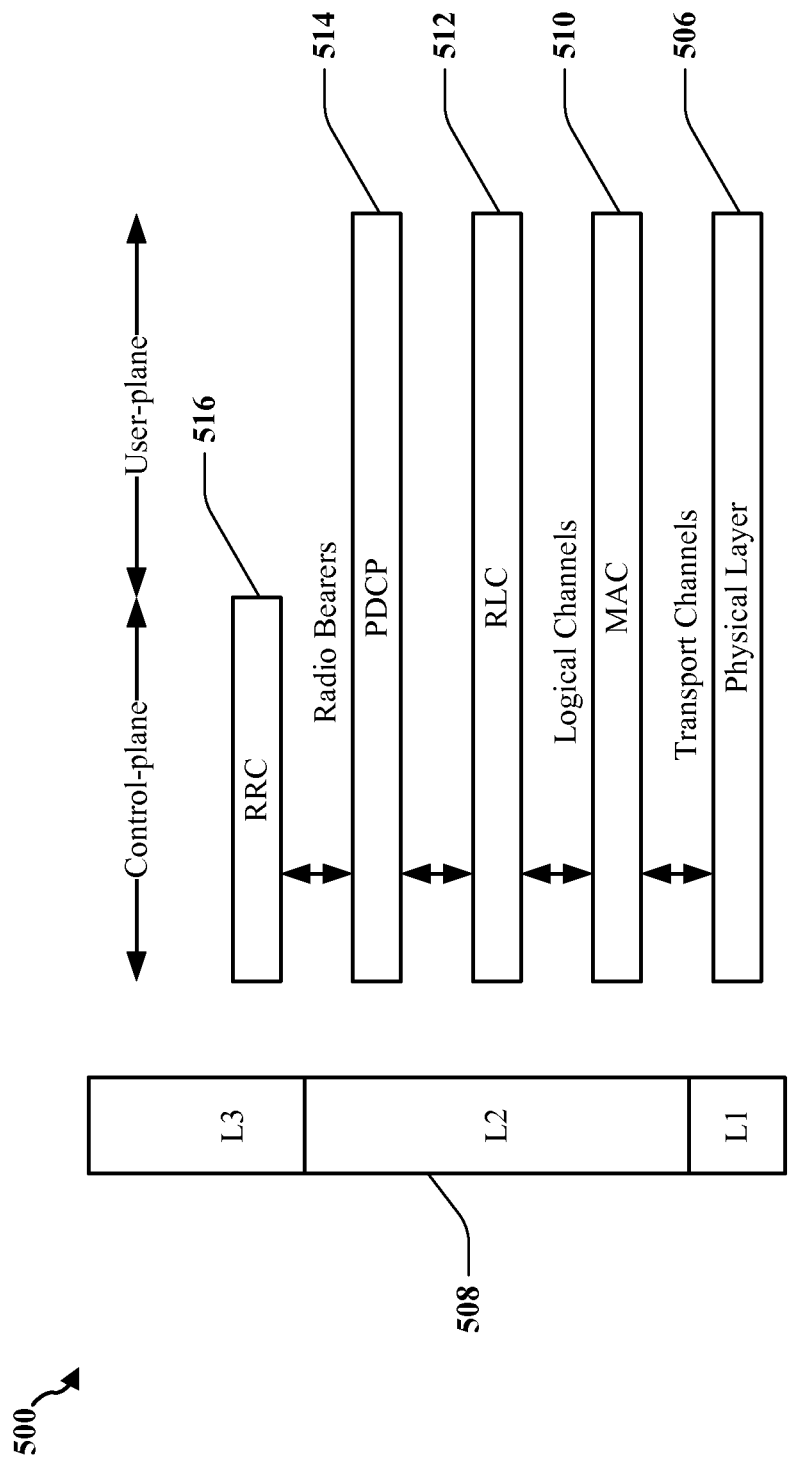
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
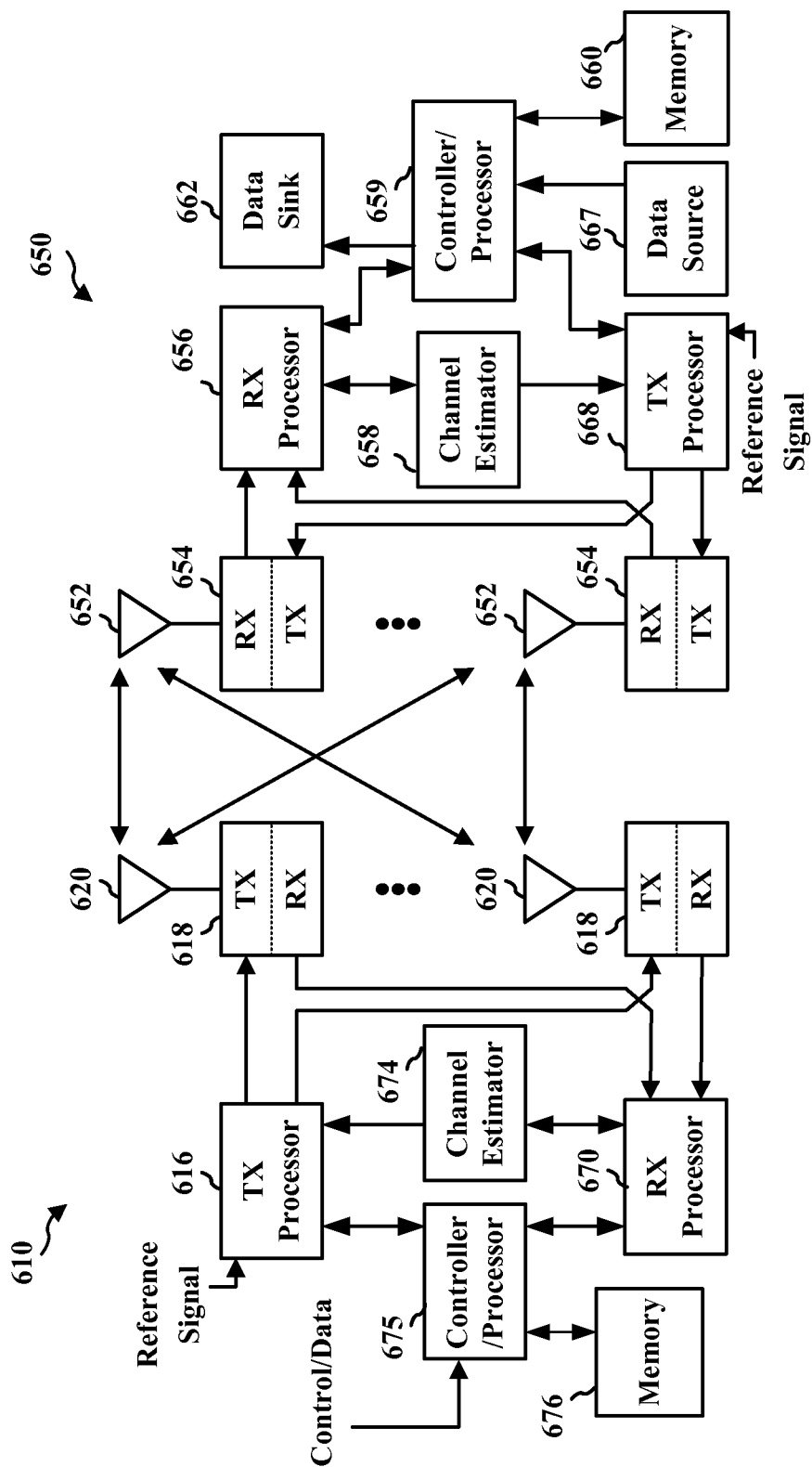
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
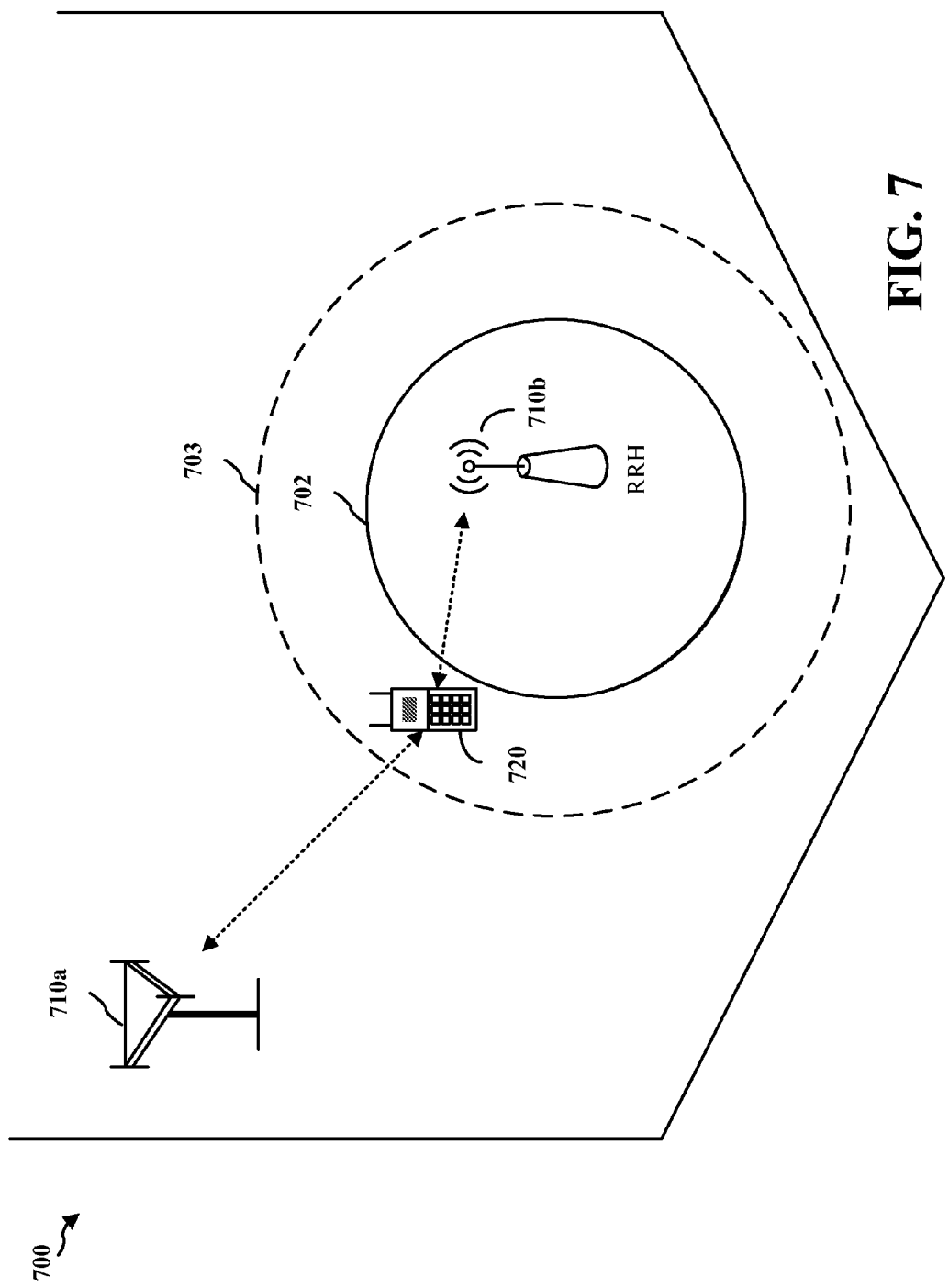
FIG. 7 is a diagram illustrating a range expanded cellular region in a heterogeneous network.

FIG. 7 is a diagram 700 illustrating a range expanded cellular region in a heterogeneous network. A lower power class eNB such as the remote radio head (RRH) 710b may have cellular cell range expansion (CRE) region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the CRE region 703 and to accept a handoff of the UE 720 from the macro eNB 710a as the UE 720 enters the CRE region 703.

Figure 8:
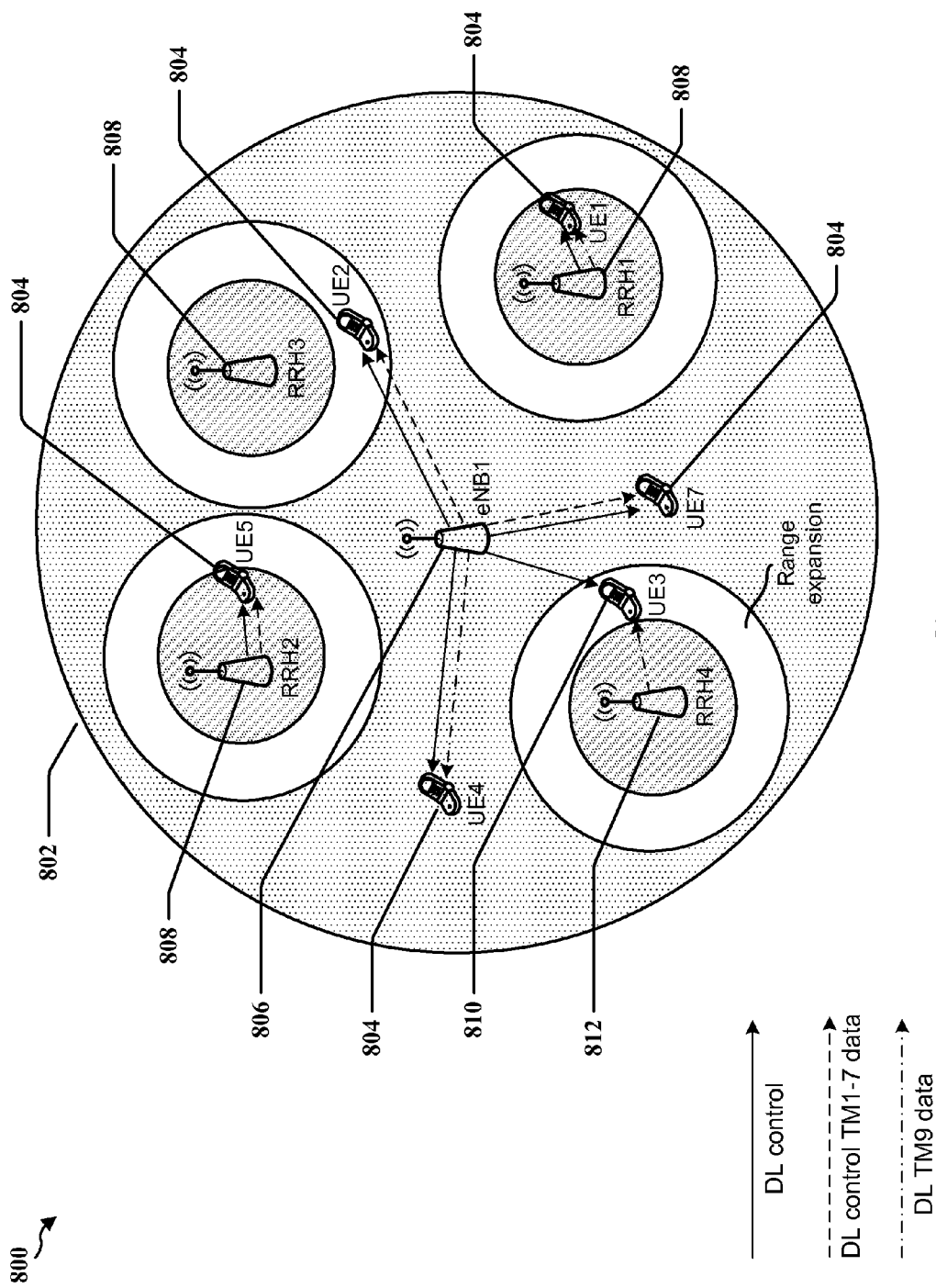
FIG. 8 illustrates decoupling of control and data in a coordinated multipoint transmission system.

In certain embodiments, an RRC layer may manage uplink power control in order to maximize the power of desired received signals while limiting generated interference, particularly interference between neighboring cells and between proximately located UEs. FIG. 8 illustrates one LTE example, in which one or more eNB 806, multiple repeaters or RRHs 808, 812 and UEs 804, 810 operate within the same cell 802. Power control, using closed loop and/or open loop methodologies, may reduce uplink interference. For open loop power control, a UE 804 may be provided with cell-specific and UE-specific open loop power control parameters that may include, for example, a path loss compensation factor. Open loop power control may rely on open loop path loss (PL) measurement. In closed loop power control, a UE 804 may be provided with one or more power control commands. Power control commands may be transmitted to a UE using unicast and/or groupcast control channels, which may impact PUSCH, PUCCH, and Sounding Reference Signals (SRS). SRS may comprise uplink reference signals, which are transmitted to enable an eNB to perform channel sounding.

Closed loop PUSCH power control may support both an accumulative power control mode and an absolute power control mode. The UE 804 may select accumulative or absolute power control modes based on a configuration provided by higher layers. For closed loop PUSCH power control in accumulative power control mode, accumulated power control commands at subframe i may be maintained through the function:

$f(i)=f(i-1)+\delta_{PUSCH}(i-K_{PUSCH})$, where $\delta_{PUSCH}$ is the received power control commands, and the value $K_{PUSCH}$ defines the timing relationship.

Closed loop PUCCH power control typically supports only an accumulative power control mode. For closed loop PUCCH power control, accumulated power control commands at subframe i may be maintained through the function:

$g(i)=g(i-1)+\Sigma\{m=0\}^{\{M-1\}}\delta_{PUSCH}(i-k\_m)$, where $\delta_{PUSCH}$ is the received power control commands, and the value k_m defines the timing relationship, such that
for FDD, M=1, k_0=4, and
for TDD, the values of M and k_m depend on the downlink and uplink sub frame configuration.

SRS power control may be tied to PUSCH through the same f(i). A power offset between SRS and PUSCH may be configurable and an accounting for bandwidth difference is made. In other words, power may be scaled according to the bandwidth difference between PUSCH and SRS.

A UE 804 may provide a power headroom report (PHR), in which the UE may report its power headroom to the eNB 806, under certain conditions. The power headroom may be derived from calculations based on PUSCH transmit power and a maximum transmit power.

In some configurations, a UE 804 can be configured for two or more carriers. One carrier is typically configured as the primary component carrier (PCC). PCC may additionally be referred to as a primary cell or PCell, where a cell comprises a combination of a downlink component carrier and an uplink component carrier. PUCCH is typically transmitted only on the PCC, regardless of how many carriers are configured for a UE 804.

A UE 804 may maintain separate accumulative power control loops for PUSCH for different configured cells:

$f\_c(i)$, where c is the serving cell 802 and c is one of the configured cells. In cases where there is only one PUCCH for the UE 804, there is only one g(i). When power limitation is in effect, the UE 804 may perform power prioritization among two or more UL channels. Typically, PUCCH is given the highest priority, followed by PUSCH and PHR may be reported for two types of configuration. A Type 1 configuration may relate to a configuration where there is no PUCCH, and the PHR is based on PUSCH. A Type 2 configuration may relate to a configuration where there is a PUCCH, and PHR is based on PUCCH and PUSCH.

Certain embodiments support coordinated multipoint (CoMP) transmission schemes, where multiple base stations coordinate transmissions to a UE 804 in downlink CoMP, and/or where one or more base stations receive from one or more UEs 804 in uplink CoMP. Downlink CoMP and uplink CoMP may be enabled jointly or separately for a UE 804. In joint transmission (downlink) CoMP, multiple eNBs 806 may transmit the same data to one or more UEs 804. In joint reception (uplink) CoMP, a plurality of eNBs 806 may receive the same data from a UE 804.

In some CoMP systems, beam forming may be coordinated, whereby an eNB 806 transmits to a UE 804 using beams that are chosen to reduce interference to UEs 804 in neighboring cells. In some CoMP systems, dynamic point selection may be employed, whereby one or more cells 802 involved in data transmissions may change between successive subframes.

CoMP may be provided in homogeneous networks and/or in heterogeneous networks. The connection between nodes involved in CoMP may be provided using optical fiber and/or X2. In HetNet CoMP, a low power node may comprise a lower power class (e.g., RRH 710b in FIG. 7).

As illustrated in FIG. 8, decoupled control and data is possible in CoMP, whereby UE3 810 may receive control from eNB 806 and data from RRH4 812. Thus, downlink control and data are decoupled.

In some embodiments, PUCCH generation is based on a physical cell identifier (PCI). The PCI identifies an LTE cell 802 and is typically provided during X2 setup procedures. An UE 804 can choose the PCI from a list of possible values and the PCI may be communicated to a UE 804 using a Primary Synchronization Sequence (PSS) and/or Secondary Synchronization Sequence (SSS). In some embodiments, a PUCCH format used by UE 804 may be tied to the PCI. Sequence generation, cyclic shift hopping may also be determined by the PCI.

Some embodiments may employ a virtual cell ID to achieve cell splitting. In one example, a virtual cell ID replaces the PCI. In some embodiments, different virtual cell IDs may be used with different PUCCH formats, e.g., formats 1, 1a, 1b, 2, 2a, 2b, etc.

In some embodiments, uplink power control may be linked to certain PUCCH formats. The parameter $\Delta_{F\_PUCCH}$ may be defined by higher layers as having values that correspond to PUCCH format (F) relative to PUCCH format 1a, for example. In this example, both UE 804 and eNB 806 need only maintain one power control loop for all PUCCH formats. The power control command for PUCCH may be used for all PUCCH formats with the $\Delta_{F\_PUCCH}$ used as an offset among different formats, whereby:

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{T\times D}(F') + g(i) \end{array} \right\} \quad \text{Eq. 1}$$

In CoMP, it is possible that uplink reception points may change from time to time. For example, uplink reception points may change when switches in dynamic serving cell occur. When uplink reception points for PUCCH change from time to time, different power control loops may be maintained for the UE 804 to permit the UE to communicate with two or more cells 802.

In some embodiments, a single virtual cell ID is used for all PUCCH formats, with all PUCCH formats being served by the same virtual cell. All PUCCH formats may experience similar interference levels from other UEs 804 and/or with other physical or virtual cells and a power control specification which references the same format (e.g., Format 1a) may be reused. If different virtual cell IDs are used for all PUCCH formats, then different PUCCH channels may be processed by different physical and/or virtual cells. Different path loss to different cells may be observed, as well as different interference levels at different cells and current PUCCH power control specifications may not work.

In some embodiments, a single loop is maintained and tied to one channel. The same g(i) may be used to calculate power adjustment for all PUCCH formats and different offsets may be used for each PUCCH format to address different path loss interference levels associated with different virtual cells. This adjustment can be RRC signaled, or dynamically signaled, whereby an index is dynamically signaled to enable selection of a value from a predefined or statically configured set of values.

In some embodiments, the value of $P_{0\_PUCCH}$ and $PL_c$ can be tied to a virtual cell ID, such that if virtual cell ID is signaled to a UE-specific PUCCH channel, it automatically measures the PL from the cell mapped to the virtual cell ID and applies $P_0$ for the virtual cell. This configuration can be further linked to a channel state information reference signal (CSI-RS), such that once the virtual cell ID is known, UE can measure path loss from the CSI-RS mapped to that virtual cell ID. Reference Signal.

$$P_{PUCCH}(i) = \min\left\{ \begin{array}{l} P_{CMAX,c}(i), \\ P_{0\_PUCCH}(k) + PL_c(k) + h(n_{CQI}, n_{HARQ}, n_{SR}) + \\ \Delta_{F\_PUCCH}(F) + \Delta_{T\times D}(F') + g(i) \end{array} \right\} \quad \text{Eq. 2}$$

Compared with the power control equation Eq. 1, an index k is added in some embodiments to allow multiple values of $P_{0\_PUCCH}$ and $PL_c$ to be linked to different virtual cell IDs and/or PUCCH formats. The CSI-RS may provide information describing characteristics of the radio channel, using a reference signal known to the receiver. The reference signal may be inserted into a transmitted signal to enable channel estimation for coherent demodulation and measurements.

Some embodiments maintain different loops for different PUCCH formats. For example, more than one loop may be permitted for PUCCH such that more than one loop is available for different PUCCH formats. For example, the function g(i) can be made a function of k, which may be linked to different PUCCH formats and/or virtual cell IDs. The mapping of a PUCCH format to a loop can be based on explicit or implicit signaling. Explicit signaling may expressly identify the mapping while implicit signaling may convey information in a combination of signals and/or parameters provided in the signal. The combination of signals and/or parameters may include signals or parameters that have other uses and meanings and a specific combination of settings may be used by a UE 804 to identify a mapping of a PUCCH format from a set of formats known to the UE 804 or preconfigured by an eNB 806. In one example, the same loop may be used for PUCCH formats of the same virtual cell ID, and different loops may are used for formats of different virtual cell IDs. The number of loops can be the same as the number of distinct virtual cell IDs configured for PUCCH for the UE 804.

In certain embodiments, the use of different loops may be made on a standalone basis and/or may be combined with the use of a single loop tied to one channel. By changing g(i, k), closed loop uplink power control can be used for a PUCCH format that has its own virtual cell ID, thereby minimizing changes to $P_{0\_PUCCH}$ and $PL_c$.

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{T\times D}(F') + g(i, k) \end{array} \right\} \quad \text{Eq. 3}$$

The function g(i) in the power control equation Eq. 1, is modified to be a function g(i, k) in Eq. 3 and is a function of k, which may be linked to different PUCCH formats and/or virtual cell IDs.

In some embodiments, different offsets PO and different loops PL may be used to provide a more general solution, where all three can be a function of different PUCCH formats.

$$P_{PUCCH}(i) = \min\left\{ \begin{array}{l} P_{CMAX,c}(i), \\ P_{0\_PUCCH}(k) + PL_c(k) + h(n_{CQI}, n_{HARQ}, n_{SR}) + \\ \Delta_{F\_PUCCH}(F) + \Delta_{T\times D}(F') + g(i, k) \end{array} \right\} \quad \text{Eq. 4}$$

As with Eq. 2, Eq. 4 differs from the power equation in Eq. 1 because an index k is added in Eq. 4 to allow multiple values of $P_{0\_PUCCH}$ and $PL_c$ to be linked to different virtual cell IDs and/or PUCCH formats. Furthermore, the function g(i) in the power control equation Eq. 1, is modified to be a function g(i, k) in Eq. 4 and is a function of k, which may be linked to different PUCCH formats and/or virtual cell IDs (compare, for example, Eq. 3).

Some embodiments employ a general formula for all PUCCH formats that is a function of virtual cell ID, rather than a function of PUCCH format. One or more of the three parameters $P_{0\_PUCCH}$, $PL_c$ and g(i) may be calculated as a function of virtual cell ID j, and g(i) may be mapped to a corresponding PUCCH formats. When multiple PUCCH formats are mapped to the same virtual cell ID, a single loop with the same PL, g(i) and $\Delta_{F\_PUCCH}$ may still be used.

For each option selected, it is typically possible to provide a format adjustment linked to the virtual cell ID, whereby $\Delta_{F\_PUCCH}$ can be disabled if the other functions have already taken into account format differences.

In some embodiments, all of the options discussed herein may be applied to each carrier when carrier aggregation is used.

$$P_{PUCCH}(i) = \min \begin{Bmatrix} P_{CMAX,c}(i), \\ P_{0\_PUCCH}(j) + PL_c(j) + h(n_{CQI}, n_{HARQ}, n_{SR}) + \\ \Delta_{F\_PUCCH}(F, j) + \Delta_{T \times D}(F') + g(i, j) \end{Bmatrix} \quad \text{Eq. 5}$$

Equation 5 substitutes the index j for index k, which was used in Eqs. 2, 3, and 4. Index j may be a virtual cell ID while index k may be linked to different PUCCH formats.

Figure 9:
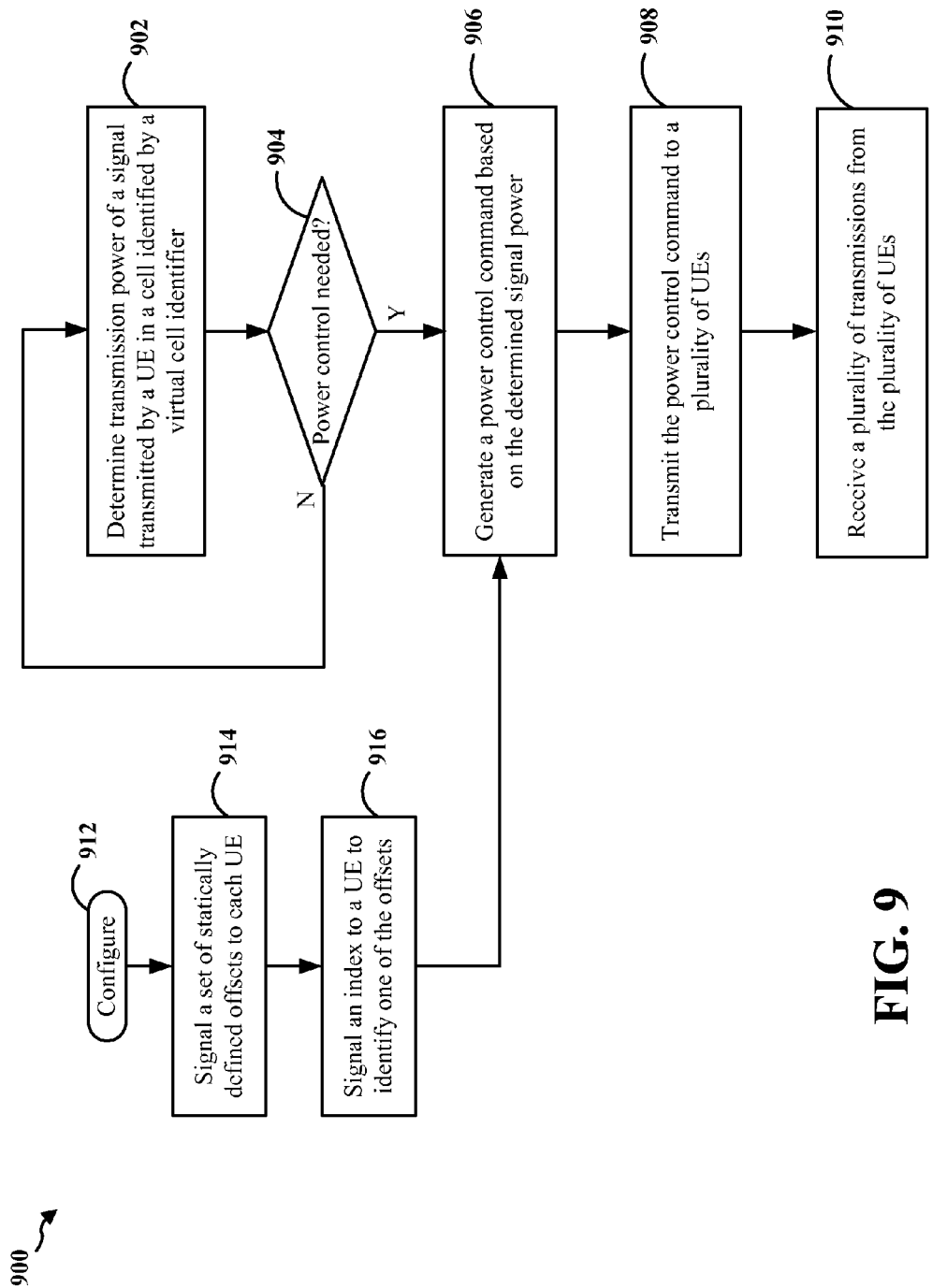
FIG. 9 is a flow chart of a method of wireless communication by an eNB.

FIG. 9 is a flow chart 900 of a method of wireless communication. The method may be performed by an eNB 806. At step 902, the eNB 806 may determine a transmission power of a signal transmitted by a UE 804 in a cell 802 that may be identified by a virtual cell identifier. During configuration 910, and/or at other times, the eNB 806 may transmit the virtual cell identifier to one or more UEs 806. The power of the signal transmitted by the UE 804 may be measured responsive to the transmission of the virtual cell identifier. The power of the signal transmitted by the UE 804 may be determined using channel state information corresponding to the virtual cell identifier.

At step 904, the eNB 806 may determine whether the signal from UE 804 is likely to interfere with another UE 804 or another eNB 806. If the signal is not likely to interfere, the eNB 806 may resume normal operation and may continue monitoring the power of signals transmitted by the UE 804 at step 902.

If the eNB 806 determines at step 904 that interference is occurring or likely to occur, then at step 906, the eNB 806 may generate a power control command based on the determined power of the signal transmitted by the UE 804.

At step 908, the eNB 806 may transmit the power control command to a plurality of UEs. Each of a plurality of UEs 804 in the cell 802 may respond to the power control command transmitted by the eNB 806 differently from the other UEs 804 in the plurality of UEs 804. For example, each UE 804 may respond to the power control command by applying a power offset.

Subsequent to the transmitting of the power control command, at step 910, the eNB receives a plurality of transmissions from the plurality of UEs. For each respective UE, the transmission power of transmission from the UE corresponds to the power control command transmitted by the eNB and a predefined power offset associated with the respective UE. Accordingly, some of the plurality of transmissions received by the eNB may have different transmission powers.

Configuration mode 912 depicts that the eNB 806 may dynamically or implicitly signal information used to identify a power offset. The configuration employs a set of predefined offsets which may be selected statically or dynamically.

At step 914, the eNB 806 may signal a set of statically defined offsets to one or more of the UEs 804. Alternatively, for example, the eNB 806 may signal a virtual cell ID to the UE 804 that may be used to configure uplink power, these virtual cell IDs may be implicitly associated with power offsets.

At step 916, the eNB 806 may concurrently, and/or at a later point in time, provide an index to each UE. The index may identify one of the set of statically defined offsets. The index may correspond to a virtual cell ID and/or may be related to a PUCCH format.

In certain embodiments, different PUCCHs are associated with different virtual cell identifiers. Different power control loops may be defined for each PUCCH. During configuration 910, and/or at another time, the eNB 806 may signal a mapping of a format of one or more PUCCHs. The mapping may be implicitly signaled.

In some embodiments, the steps of determining the power of the signal transmitted by the UE, generating the one or more power control commands, and transmitting the one or more power control commands to the UE may be performed for each carrier in a carrier aggregation system.

Figure 10:
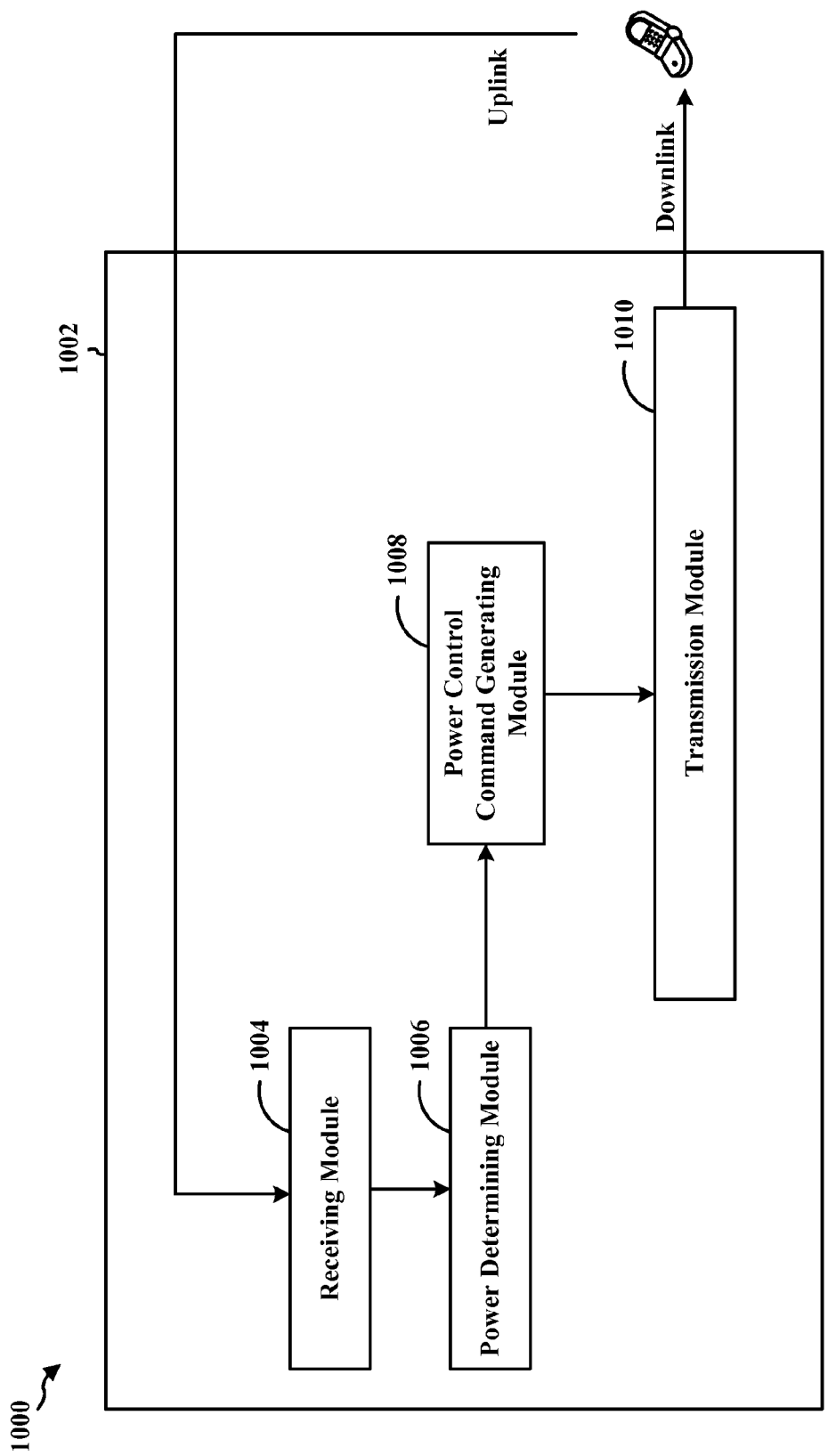
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be an eNB 806. The apparatus 1002 includes a receiving module 1004 that receives a signal transmitted from a UE 804, and a power determining module 1006 that determines a transmission power of the signal transmitted by the UE. The UE may be in a cell identified by a virtual cell identifier. The power of the signal transmitted by the UE may be measured responsive to the transmission of the virtual cell identifier. The power of the signal transmitted by the UE may be determined using channel state information corresponding to the virtual cell identifier.

The apparatus 1002 also includes a power control generating module 1008 that generates a power control command based on the determined power of the signal transmitted by the UE, and a transmission module 1008 that transmits the power control command to a number of UEs 804. The transmission module 1008 may also, during configuration, dynamically or implicitly signal information used to identify a power offset. The configuration employs a set of predefined offsets which may be selected statically or dynamically. To this end, the transmission module 1008 may signal a set of statically defined offsets to one or more of the UEs 804. Alternatively, the transmission module 1008 may signal a virtual cell ID to the UE 804 that may be used to configure uplink power. These virtual cell IDs may be implicitly associated with power offsets. The transmission module 1008 may concurrently, and/or at a later point in time, provide an index to each UE. The index may identify one of the set of statically defined offsets. The index may correspond to a virtual cell ID and/or may be related to a PUCCH format.

Subsequent to the transmitting of the power control command by the transmission module 1008, the receiving module 1004 receives a plurality of transmissions from the plurality of UEs. For each respective UE, the transmission power of transmission from the UE corresponds to the power control command transmitted by the eNB and a predefined power offset associated with the respective UE. Accordingly, some of the plurality of transmissions received by the eNB may have different transmission powers.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
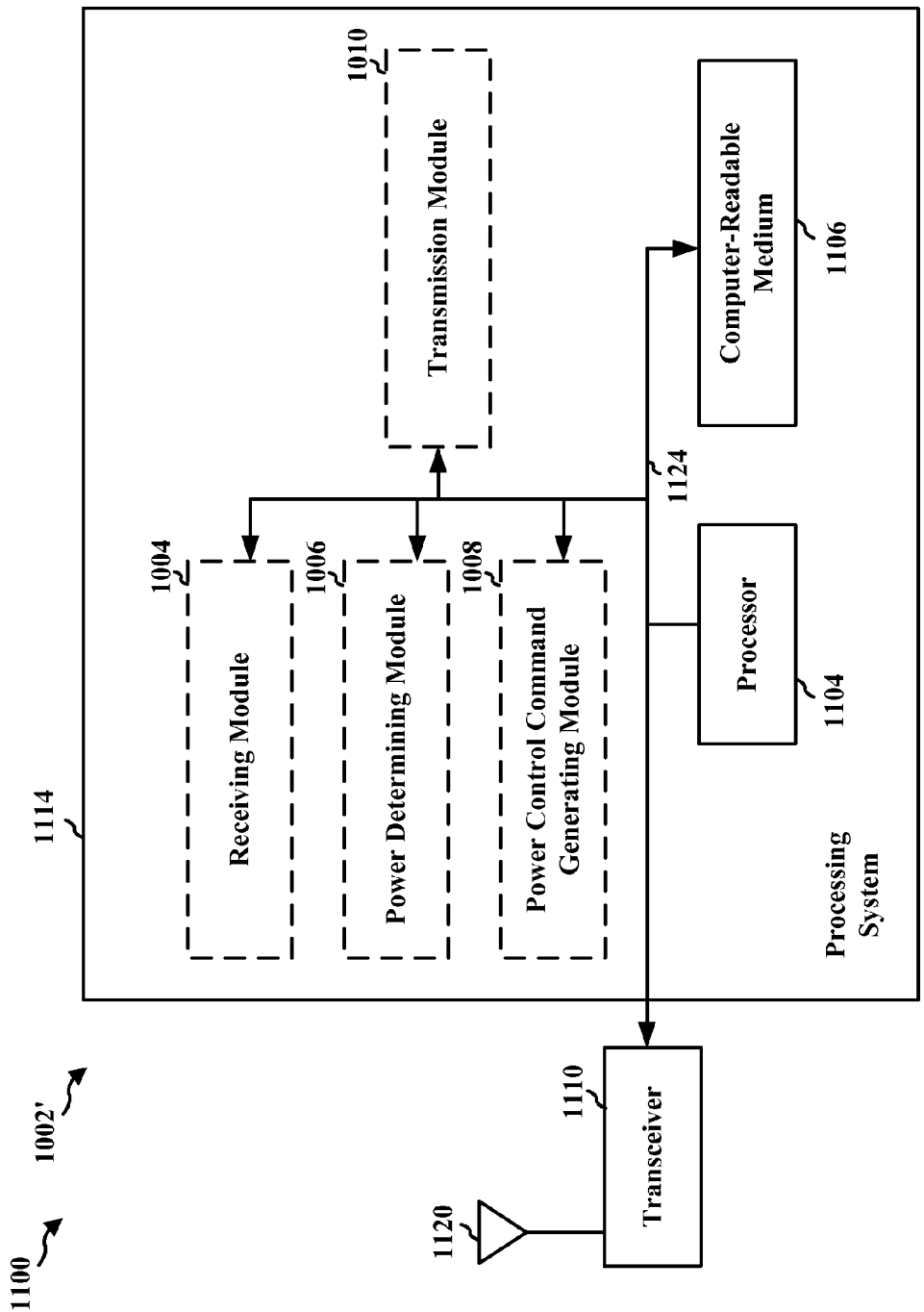
FIG. 11 is a diagram illustrating an example of a hardware implementation for an apparatus employing a processing system.

FIG. 11 is a diagram illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1004. In addition, the transceiver 1110 receives information from the processing system 1114, specifically the transmission module 1010, and based on the received information, generates a signal to be applied to the one or more antennas 1120.

The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, and 1010. The modules may be software modules running in the processor 1104, resident/stored in the computer readable medium 1106, one or more hardware modules coupled to the processor 1104, or some combination thereof. The processing system 1114 may be a component of the eNB 610 and may include the memory 676 and/or at least one of the TX processor 616, the RX processor 670, and the controller/processor 675

In one configuration, the apparatus 1002/1002' for wireless communication includes means 1004 for receiving a signal from a UE 804, and means 1006 for determining a transmission power of a signal transmitted by the UE. The UE may be in a cell identified by a virtual cell identifier. The apparatus 1002/1002' also includes means 1008 for generating a power control command based on the determined power of the signal transmitted by the UE, and means 1010 for transmitting the power control command to a number of UEs. Subsequent to transmission of the power control command, the means 1004 for receiving also receives a plurality of transmissions from the plurality of UEs. As previously described, for each respective UE, the transmission power of transmission from the UE corresponds to the power control command transmitted by the eNB and a predefined power offset associated with the respective UE. Accordingly, some of the plurality of transmissions received by the eNB may have different transmission powers.

The transmitting means 1010 may dynamically signal the predefined power offset to the number of UEs 804. The UEs 804 may apply the power offset when responding to the power control command. The transmitting means 1010 may signal a set of statically defined offsets to the each UE 804. The transmitting means 1010 may further signal an index to the each UE 804. The index may identify one of the set of statically defined offsets.

The transmitting means 1010 may transmit the virtual cell identifier to the UE 804. The power of the signal transmitted by the UE may be measured responsive to the transmission of the virtual cell identifier. The power of the signal transmitted by the UE may be determined using channel state information corresponding to the virtual cell identifier.

The transmitting means 1010 may signal a mapping of a format of one or more PUCCHs. Different PUCCHs may be associated with different virtual cell identifiers. Different power control loops may be defined for each PUCCH. Means 1010 may implicitly signal the mapping.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 12:
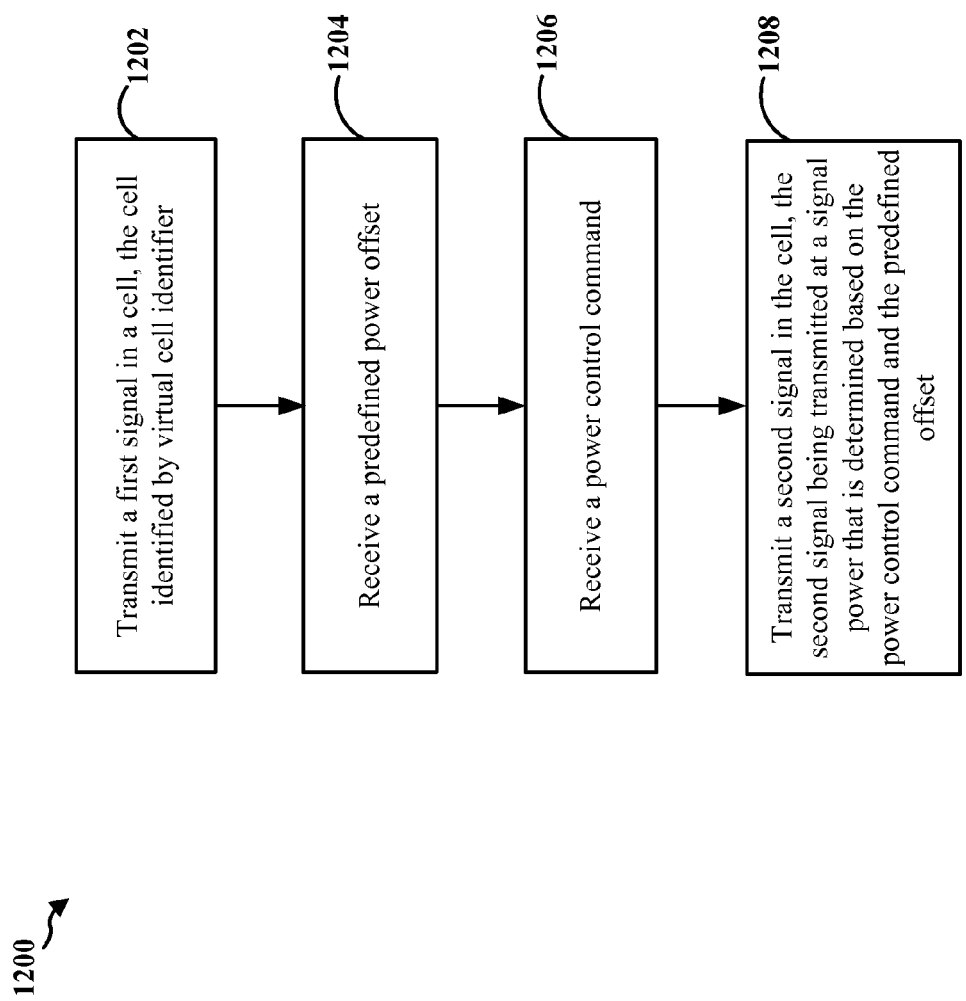
FIG. 12 is a flow chart of a method of wireless communication by a UE.

FIG. 12 is a flow chart 1200 of a method of wireless communication. The method may be performed by a UE. At step 1202, the UE transmits a first signal in a cell. The cell may be identified by a virtual cell identifier. The virtual cell identifier may be received by the UE from an eNB. Different physical uplink control channels (PUCCHs) may associate with different virtual cell identifiers, and different power control loops may be defined for each PUCCH. Accordingly, the UE may receive a mapping of a format of one or more PUCCHs.

At step 1204, the UE receives a predefined power offset. The predefined offset may be received in the form of a set of statically defined offsets and an index that identifies one of the set of statically defined offsets.

At step 1206, the UE receives a power control command. The power control command may be based on a determined signal power that corresponds to the transmission power of the first signal transmitted by the UE.

At step 1208, the UE transmits a second signal in the cell. The second signal is transmitted at a signal power that is determined based on the power control command and the predefined offset. For example, the signal power may be determined by adjusting a power value in the power control command based on the predefined power offset.

Figure 13:
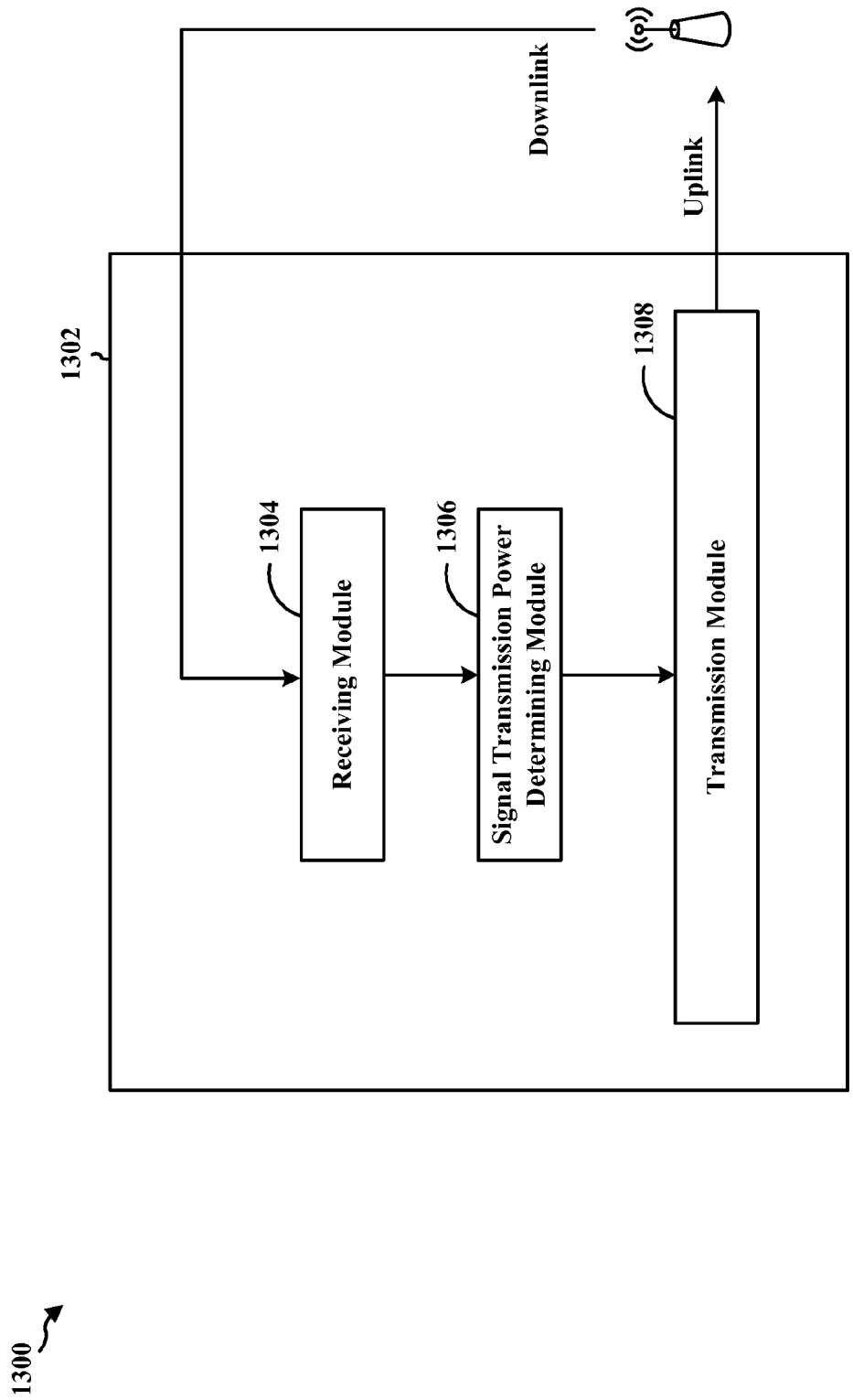
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The apparatus 1302 includes a transmission module 1308 that transmits an uplink signal in a cell. The cell may be identified by virtual cell identifier. The apparatus 1302 also includes a receiving module 1304 that receives a power control command and a predefined offset. The power control command is based on a determined signal power that corresponds to a transmission power of the first signal transmitted by the transmission module 1308. The apparatus 1302 also includes a signal transmission power determining module 1306 that determines a signal power for transmitting a second signal in the cell. This signal power may be determined by adjusting a power value in the power control command received by the receiving module 1304 based on the predefined offset, which is also received by the receiving module 1304. The transmission module 1308 subsequently transmits a second uplink signal in the cell using the signal power determined by the signal transmission power determining module 1306.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
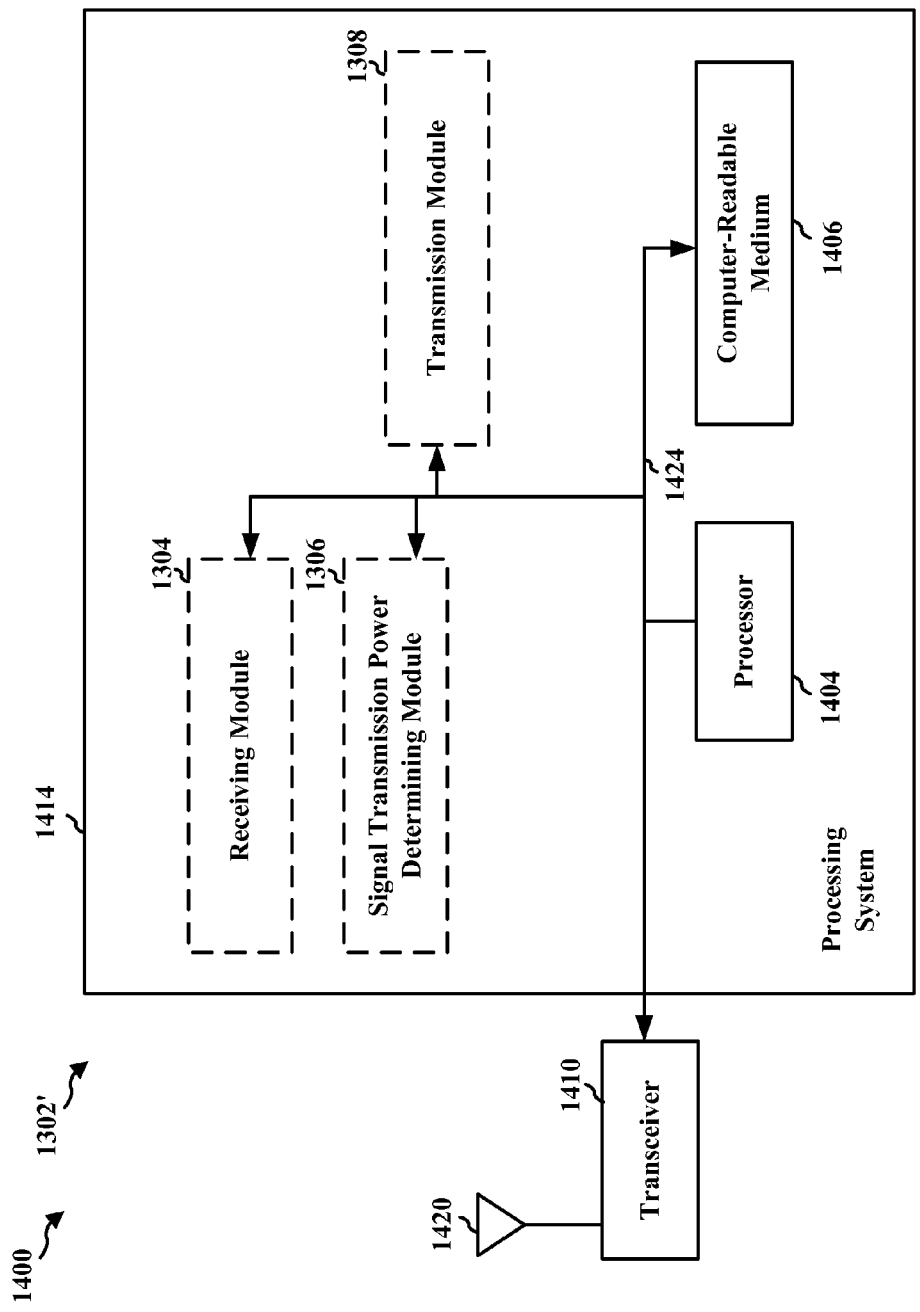
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1304. In addition, the transceiver 1410 receives information from the processing system 1414, specifically the transmission module 1308, and based on the received information, generates a signal to be applied to the one or more antennas 1420.

The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, and 1308. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for transmitting a first signal in a cell. The cell may be identified by virtual cell identifier. The 1302/1302' also includes means for receiving a predefined power offset and means for receiving a power control command. The power control command may be based on a determined signal power that corresponds to a transmission power of the transmitted first signal. The signal power used to transmit the second signal may be determined by adjusting a power value in the power control command based on the predefined power offset received by the means for receiving.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a base station in a range expanded cellular region, the range expanded cellular region including the base station and a plurality of virtual cells, the method comprising:
   determining a transmission power of a signal transmitted by a first user equipment (UE) of a plurality of UEs in the range expanded cellular region, the first UE being associated with a first virtual cell of the plurality of virtual cells;
   generating a power control command based on the transmission power of the signal transmitted by the first UE;
   transmitting the power control command to the plurality of UEs; and receiving a signal from a second UE of the plurality of UEs subsequent to the transmitting of the power control command, the second UE being associated with a second virtual cell of the plurality of virtual cells, the transmission power of the signal from the second UE corresponding to the power control command and a power offset associated with the second virtual cell.

2. The method of claim 1, further comprising dynamically signaling the power offset to the plurality of UEs.

3. The method of claim 2, wherein the dynamically signaling the power offset includes signaling to each UE from the plurality of UEs:
   a set of statically defined power offsets; and
   an index, wherein the index is mapped to the plurality of virtual cells and identifies one of the set of statically defined power offsets as the power offset.

4. The method of claim 1, wherein the power offset is associated with a virtual cell identifier of the second virtual cell.

5. The method of claim 4, further comprising transmitting the virtual cell identifier to the second UE, wherein the determined transmission power of the signal from the second UE is determined responsive to the transmission of the virtual cell identifier.

6. The method of claim 4, wherein the transmission power of the signal from the second UE is determined using channel state information corresponding to the virtual cell identifier.

7. The method of claim 4, wherein the virtual cells of the plurality of virtual cells are associated with different virtual cell identifiers, and different formats of physical uplink control channels (PUCCHs) are associated with the different virtual cell identifiers, and wherein different power control loops are defined for each of the different formats of the PUCCHs.

8. The method of claim 7, further comprising signaling a mapping of a format of one or more PUCCHs.

9. The method of claim 8, wherein the mapping is implicitly signaled.

10. The method of claim 1, wherein determining the transmission power, generating the power control commands, and transmitting the power control commands are performed for each carrier in a carrier aggregation system.

11. The method of claim 7, wherein the format associated with the virtual cell identifier of the second virtual cell is physical uplink control channel (PUCCH) format 1a.

12. An apparatus for wireless communication of a base station in a range expanded cellular region, the range expanded cellular region including the base station and a plurality of virtual cells, the apparatus comprising:
   means for determining a transmission power of a signal transmitted by a first user equipment (UE) of a plurality of UEs in the range expanded cellular region, the first UE being associated with a first virtual cell of the plurality of virtual cells;
   means for generating a power control command based on the transmission power of the signal transmitted by the first UE;
   means for transmitting the power control command to the plurality of UEs; and
   means for receiving a signal from a second UE of the plurality of UEs subsequent to the transmitting of the power control command, the second UE being associated with a second virtual cell of the plurality of virtual cells, the transmission power of the signal from the second UE corresponding to the power control command and a power offset associated with the second virtual cell.

13. The apparatus of claim 12, wherein the means for transmitting is configured to dynamically signal the power offset to the plurality of UEs.

14. The apparatus of claim 13, wherein to dynamically signal the power offset, the means for transmitting is further configured to signal to each UE from the plurality of UEs:
   a set of statically defined power offsets, and
   an index, wherein the index is mapped to the plurality of virtual cells and identifies one of the set of statically defined power offsets as the power offset.

15. The apparatus of claim 12, wherein the power offset is associated with a virtual cell identifier of the second virtual cell.

16. The apparatus of claim 15, wherein the means for transmitting is configured to transmit the virtual cell identifier to the second UE, wherein the determined transmission power of the signal from the second UE is determined responsive to the transmission of the virtual cell identifier.

17. The apparatus of claim 15, wherein the transmission power of the signal from the second UE is determined using channel state information corresponding to the virtual cell identifier.

18. The apparatus of claim 15, wherein the virtual cells of the plurality of virtual cells are associated with different virtual cell identifiers, and different formats of physical uplink control channels (PUCCHs) are associated with the different virtual cell identifiers, and wherein different power control loops are defined for each of the different formats of the PUCCHs.

19. The apparatus of claim 18, wherein the means for transmitting is configured to signal a mapping of a format of one or more PUCCHs.

20. The apparatus of claim 19, wherein the mapping is implicitly signaled.

21. An apparatus for wireless communication of a base station in a range expanded cellular region, the range expanded cellular region including the base station and a plurality of virtual cells, the apparatus comprising:
   a memory; and
   at least one processor coupled to the memory and configured to:
   determine a transmission power of a signal transmitted by a first user equipment (UE) of a plurality of UEs in the range expanded cellular region, the first UE being associated with a first virtual cell of the plurality of virtual cells;
   generate a power control command based on the transmission power of the signal transmitted by the first UE;
   transmit the power control command to the plurality of UEs; and
   receive a signal from a second UE of the plurality of UEs subsequent to the transmitting of the power control command, the second UE being associated with a second virtual cell of the plurality of virtual cells, the transmission power of the signal from the second UE corresponding to the power control command and a power offset associated with the second virtual cell.

22. The apparatus of claim 21, wherein the at least one processor is further configured to dynamically signal the power offset to the plurality of UEs.

23. The apparatus of claim 22, wherein to dynamically signal the power offset, the at least one processor is further configured to signal to each UE from the plurality of UEs:
   a set of statically defined power offsets, and an index, wherein the index is mapped to the plurality of virtual cells and identifies one of the set of statically defined power offsets as the power offset.

24. The apparatus of claim 21, wherein the power offset is associated with a virtual cell identifier of the second virtual cell.

25. The apparatus of claim 24, wherein the at least one processor is further configured to transmit the virtual cell identifier to the second UE, wherein the determined transmission power of the signal from the second UE is determined responsive to the transmission of the virtual cell identifier.

26. The apparatus of claim 24, wherein the transmission power of the signal from the second UE is determined using channel state information corresponding to the virtual cell identifier.

27. The apparatus of claim 24, wherein the virtual cells of the plurality of virtual cells are associated with different virtual cell identifiers, and different formats of physical uplink control channels (PUCCHs) are associated with the different virtual cell identifiers, and wherein different power control loops are defined for each of the different formats of the PUCCHs.

28. The apparatus of claim 27, wherein the at least one processor is further configured to signal a mapping of a format of one or more PUCCHs.

29. The apparatus of claim 28, wherein the mapping is implicitly signaled.

30. A non-transitory computer-readable medium storing computer executable code for wireless communication of a base station in a range expanded cellular region, the range expanded cellular region including the base station and a plurality of virtual cells, the computer executable code comprising code for:
    determining a transmission power of a signal transmitted by a first user equipment (UE) of a plurality of UEs in the range expanded cellular region, the first UE being associated with a first virtual cell of the plurality of virtual cells;
    generating a power control command based on the transmission power of the signal transmitted by the first UE;
    transmitting the power control command to the plurality of UEs; and receiving a signal from a second UE of the plurality of UEs subsequent to the transmitting of the power control command, the second UE being associated with a second virtual cell of the plurality of virtual cells, the transmission power of the signal from the second UE corresponding to the power control command and a power offset associated with the second virtual cell.

31. The non-transitory computer-readable medium of claim 30, further comprising code for dynamically signaling the power offset to the plurality of UEs.

32. The non-transitory computer-readable medium of claim 31, wherein the code for dynamically signaling the power offset further comprises code for signaling to each UE from the plurality of UEs:
    a set of statically defined power offsets, and
    an index, wherein the index is mapped to plurality of virtual cells and identifies one of the set of statically defined power offsets as the power offset.

33. The non-transitory computer-readable medium of claim 30, wherein the power offset is associated with a virtual cell identifier of the second virtual cell.

34. The non-transitory computer-readable medium of claim 33, further comprising code for transmitting the virtual cell identifier to the second UE, wherein the determined transmission power of the signal from the second UE is determined responsive to the transmission of the virtual cell identifier.

35. The non-transitory computer-readable medium of claim 33, wherein the transmission power of the signal from the second UE is determined using channel state information corresponding to the virtual cell identifier.

36. The non-transitory computer-readable medium of claim 33, wherein the virtual cells of the plurality of virtual cells are associated with different virtual cell identifiers, and different formats of physical uplink control channels (PUCCHs) are associated with the different virtual cell identifiers, and wherein different power control loops are defined for each of the different formats of the PUCCHs.

37. The non-transitory computer-readable medium of claim 36, further comprising code for signaling a mapping of a format of one or more PUCCHs.

38. The non-transitory computer-readable medium of claim 37, wherein the mapping is implicitly signaled.

39. A method of wireless communication of a user equipment (UE) in a range expanded cellular region, the range expanded cellular region including a base station and a plurality of virtual cells, the method comprising:
    transmitting a first signal at a first transmission power;
    receiving a power control command from the base station in response to the first signal;
    determining a second transmission power based on the power control command and a power offset associated with a first virtual cell of the plurality of virtual cells, the UE being associated with the first virtual cell; and
    transmitting the second signal at the second transmission power.

40. The method of claim 39, wherein the power control command is based on the first transmission power.

41. The method of claim 39, wherein the second transmission power is determined by adjusting a power value in the power control command based on the power offset.

42. The method of claim 41, further comprising determining the power offset by:
    receiving a set of statically defined power offsets;
    receiving an index associated with an identifier of the first virtual cell, wherein the index is mapped to one of the set of statically defined power offsets; and
    determining the power offset based on the mapped power offset.

43. The method of claim 39, further comprising:
    receiving a first virtual cell identifier corresponding to the first virtual cell; and
    determining the power offset based on the first virtual cell identifier.

44. The method of claim 43, wherein the virtual cells of the plurality of virtual cells are associated with different virtual cell identifiers, and different formats of physical uplink control channels (PUCCHs) are associated with different virtual cell identifiers, and wherein different power control loops are defined for each of the different formats of the PUCCHs.

45. The method of claim 44, further comprising receiving a mapping of a format of one or more PUCCHs.

46. An apparatus for wireless communication of a user equipment (UE) in a range expanded cellular region, the range expanded cellular region including a base station and a plurality of virtual cells, the apparatus comprising:
    means for transmitting a first signal at a first transmission power;
    means for receiving a power control command from the base station in response to the first signal;

means for determining a second transmission power based on the power control command and a power offset associated with a first virtual cell of the plurality of virtual cells, the UE being associated with the first virtual cell; and
means for transmitting the second signal at the second transmission power.

47. The apparatus of claim 46, wherein the power control command is based on the first transmission power.

48. The apparatus of claim 46, wherein the second transmission power is determined by adjusting a power value in the power control command based on the power offset.

49. The apparatus of claim 48, further comprising means for determining the power offset configured to:
receive a set of statically defined power offsets;
receive an index associated with an identifier of the first virtual cell, wherein the index is mapped to one of the set of statically defined power offsets; and
determine the power offset based on the mapped power offset.

50. The apparatus of claim 46, further comprising:
means for receiving a first virtual cell identifier corresponding to the first virtual cell; and
means for determining the power offset based on the first virtual cell identifier.

51. The apparatus of claim 50, wherein the virtual cells of the plurality of virtual cells are associated with different virtual cell identifiers, and different formats of physical uplink control channels (PUCCHs) are associated with different virtual cell identifiers, and wherein different power control loops are defined for each of the different formats of the PUCCHs.

52. The apparatus of claim 51, further comprising means for receiving a mapping of a format of one or more PUCCHs.

53. An apparatus for wireless communication of a user equipment (UE) in a range expanded cellular region, the range expanded cellular region including a base station and a plurality of virtual cells, the apparatus comprising:
a memory; and
at least one processor coupled to the memory and configured to:
transmit a first signal at a first transmission power;
receive a power control command from the base station in response to the first Signal;
determine a second transmission power based on the power control command and a power offset associated with a first virtual cell of the plurality of virtual cells, the UE being associated with the first virtual cell; and
transmit the second signal at the second transmission power.

54. The apparatus of claim 53, wherein the power control command is based on the first transmission power.

55. The apparatus of claim 53, wherein the second transmission power is determined by adjusting a power value in the power control command based on the power offset.

56. The apparatus of claim 55, wherein the at least one processor is configured to determine the power offset by:
receiving a set of statically defined power offsets;
receiving an index associated with an identifier of the first virtual cell, wherein the index is mapped to one of the set of statically defined power offsets; and
determining the power offset based on the mapped power offset.

57. The apparatus of claim 53, wherein the at least one processor is further configured to:
receive a first virtual cell identifier corresponding to the first virtual cell; and
determine the power offset based on the first virtual cell identifier.

58. The apparatus of claim 57, wherein the virtual cells of the plurality of virtual cells are associated with different virtual cell identifiers, and different formats of physical uplink control channels (PUCCHs) are associated with different virtual cell identifiers, and wherein different power control loops are defined for each of the different formats of the PUCCHs.

59. The apparatus of claim 58, wherein the at least one processor is further configured to receive a mapping of a format of one or more PUCCHs.

60. A non-transitory computer-readable medium storing computer executable code for wireless communication of a user equipment (UE) in a range expanded cellular region, the range expanded cellular region including a base station and a plurality of virtual cells, the computer executable code comprising code for:
transmitting a first signal at a first transmission power;
receiving a power control command from the base station in response to the first signal;
determining a second transmission power based on the power control command and a power offset associated with a first virtual cell of the plurality of virtual cells, the UE being associated with the first virtual cell; and
transmitting the second signal at the second transmission power.

61. The non-transitory computer-readable medium of claim 60, wherein the power control command is based on the first transmission power.

62. The non-transitory computer-readable medium of claim 60, wherein the second transmission power is determined by adjusting a power value in the power control command based on the power offset.

63. The non-transitory computer-readable medium of claim 62, further comprising code for determining the power offset that comprises code for:
receiving a set of statically defined power offsets;
receiving an index associated with an identifier of the first virtual cell, wherein the index is mapped to one of the set of statically defined power offsets; and
determining the power offset based on the mapped power offset.

64. The non-transitory computer-readable medium of claim 60, further comprising code for:
receiving a first virtual cell identifier corresponding to the first virtual cell; and
determining the power offset based on the first virtual cell identifier.

65. The non-transitory computer-readable medium of claim 64, wherein the virtual cells of the plurality of virtual cells are associated with different virtual cell identifiers, and different formats of physical uplink control channels (PUCCHs) are associated with different virtual cell identifiers, and wherein different power control loops are defined for each of the different formats of the PUCCHs.

66. The non-transitory computer-readable medium of claim 65, further comprising code for receiving a mapping of a format of one or more PUCCHs.

* * * * *